Feb. 20, 1962    E. L. DANCE ETAL    3,021,922
RECOVERY AND PURIFICATION OF BORON TRICHLORIDE
Filed July 29, 1958
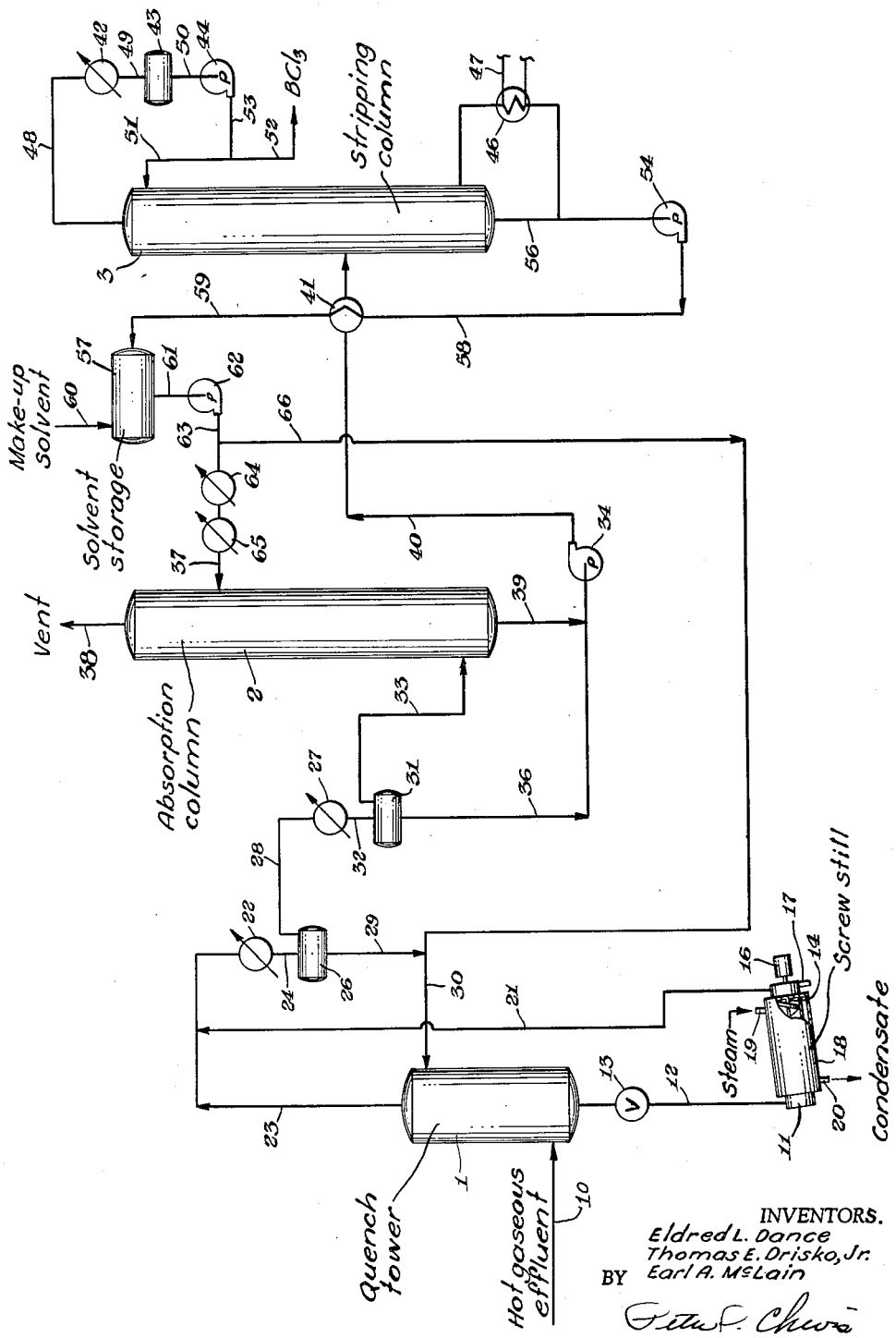
INVENTORS.
Eldred L. Dance
Thomas E. Drisko, Jr.
BY Earl A. McLain
ATTORNEY

United States Patent Office 3,021,922
Patented Feb. 20, 1962

3,021,922
RECOVERY AND PURIFICATION OF
BORON TRICHLORIDE
Eldred L. Dance and Thomas E. Drisko, Jr., Concord, and Earl A. McLain, Pleasant Hill, Calif., assignors to The Dow Chemical Company, Midland, Mich., a corporation of Delaware
Filed July 29, 1958, Ser. No. 751,726
7 Claims. (Cl. 183—115)

This invention relates to a method for the recovery and purification of boron trichloride.

More specifically this invention involves a novel combination of cooperative steps of separating and purifying boron trichloride from a gaseous affluent resulting from the reaction of a boron compound with carbon and chlorine at elevated temperatures.

The invention is particularly applicable to the recovery and purification of boron trichloride from gaseous effluents coming from a fluid or moving bed type reactor wherein the carbon used in the reaction is in particulate form. It is not intended to limit the invention, however, to the recovery and purification of boron trichloride from the gaseous effluent coming from any particular reactor, for the present invention is applicable to any hot gaseous effluent containing particles of entrained carbon or other solid particles, such as a boron compound, and inert non-condensible gases in addition to the boron trichloride.

In the preparation of boron trichloride by the reaction of a boron compound with carbon and chlorine, a gaseous effluent is obtained containing the gaseous reaction products of boron trichloride, carbon monoxide, and carbon dioxide, other inert gases which may enter the reactor with the reactants, and may contain some unreacted chlorine. The gaseous stream issuing from the reactor is at a temperature of 600° C. or higher at which if chlorine is present in the stream it may react with the carbon monoxide as the stream is cooled by conventional methods to form phosgene. The formation of phosgene is undesirable, since it is very difficult to separate from the boron trichloride. Also, even under the most favorable conditions, the gaseous effluent will contain fine particles of carbon and possibly both molten and solid particles of the boron compound entrained in the stream. These particles are swept along in the gas stream and must be removed from the product. Most frequently, the entrained particles are deposited on the first cooling surface with which the stream comes in contact coating the surface. The deposition of the particles upon the cooling surface not only decreases the heat transfer coefficient but their accumulation can soon plug or render a condenser ineffective. Thus the conventional methods for recovery of boron trichloride by partial condensation is expensive requiring frequent shut downs to clean the apparatus.

It is therefore among the objects of the invention to provide a method for the separation and purification of boron trichloride from gaseous effluents containing entrained solids and non-condensible gases which overcome the disadvantages cited above. A further object is to provide a method which is capable of continuous operation and in which a major portion of the heat removal is effected by using water cooled condensers.

According to the invention the above and other objects are attained by contacting the hot gaseous effluent containing entrained particles and non-condensible gases, such as that coming from a reactor wherein a boron compound is reacted with carbon and chlorine, with an inert liquid having a boiling point in the range of 70° to 200° C. and which is a solvent for the boron trichloride. The ratio of inert liquid to the gaseous effluent used is such that substantially all of the solvent is vaporized in cooling the hot gaseous effluent. The relatively cooled gaseous effluent mixed with the vapor of inert liquid is then partially cooled to liquify a major portion of the inert liquid vapor which is returned, for example, as reflux to the quench tower to be used for contacting more of the hot gaseous effluent. The boron trichloride is then recovered from the uncondensed portion. The uncondensed portion of the cooled gaseous and vaporous effluent may be further cooled and then contacted with additional cold inert liquid to dissolve and condense substantially all of the boron trichloride from the uncondensed portion. The undissolved or uncondensed portion of the stream after being contacted with the cold liquid consists substantially of the non-condensible gases, such as carbon dioxide and carbon monoxide, and are vented from the system. The boron trichloride is then separated from the cold inert liquid, such as by stripping or fractionation. A portion of the inert liquid freed of the boron trichloride is recycled to be cooled and used to absorb more boron trichloride, while another portion is recycled as make up to be contacted with the hot gaseous reactor effluent.

To further illustrate the features and advantages of the present invention, reference is made to the accompanying drawing wherein different pieces of apparatus are assembled to diagrammatically illustrate a flow sheet of an embodiment of the process.

As shown in the drawing three major pieces of apparatus, a quench tower 1, an absorption column 2, and a stripping column 3, are assembled. These are interconnected through appropriate piping and heat exchange equipment.

As shown, quench tower 1 is a vertically disposed vessel having a gas inlet line 10 located near the bottom of the vessel. A bottom outlet is connected to an inlet to a screw still 11 through pipe 12. The rate of flow from the bottom of the quench tower to the still may be regulated by valve 13 placed in line 12. The screw still is a cylindrical vessel inclined to the horizontal and having an auger 14 inside the vessel which is driven by a motor 16 to move the vessel's contents up the incline to discharge them through an outlet 17. A steam jacket 18 surrounds the screw still in which steam may be introduced through line 19 and condensate removed through line 20. A vapor line 21 from the top of the screw still connects with a line 23 which interconnects an outlet at top of tower 1 with a partial condenser 22. A line 24 connects the condenser with a liquid separator 26. The separator has two outlets one for a gaseous effluent located at the top of the vessel connected to another partial condenser 27 by line 28 and the other for the condensate located at the bottom and connected to an inlet near the top of the quench tower by means of a line 29 and an inlet line 30.

The discharge from partial condenser 27 is connected to a liquid separator 31 by means of a line 32. A line 33 connects a gas outlet of separator 31, located at the top, with the bottom inlet of the vertically disposed absorption column 2, while a liquid outlet of the separator located at the bottom of the vessel is connected to an inlet of a pump 34 by line 36.

The absorption tower is equipped with a solvent inlet line 37 near the top of the vessel, a vent outlet line 38 at the top, and a rich solvent outlet line 39 at the bottom which connects with feed line 36 of pump 34. Pump 34 discharges into stripping column 3 through line 40 in which heat exchanger 41 is located before the entrance to column 3.

The stripping column as shown is a conventional fractionating column equipped with a reflux condenser 42, a reflux accumulator 43, a reflux pump 44, and a reboiler 46 having a heating coil 47. The overhead outlet of column 3, the reflux condenser, the reflux accumulator, and the reflux pump are interconnected by lines 48, 49, and 50 respectively. The reflux pump discharges into reflux line 51 which is connected to an inlet near the top of the stripping column and the boron trichloride product line 52 through line 53. A bottoms pump 54 connected to a bottom outlet of stripping column 3 by line 56 discharges into a solvent storage tank 57 through lines 58 and 59 and heat exchanger 41. The solvent vessel as shown is a horizontally disposed vessel having a solvent make up inlet line 60 and an outlet line 61 at the bottom connected to a solvent pump 62. The solvent pump discharges into line 63 which directs the flow through coolers 64 and 65 before being discharged into the absorption column through line 37. A line 66 interconnects line 63 with quench tower inlet line 30.

The process may be better understood by considering a typical example where the boron trichloride is produced by the reaction of boron oxide, carbon, and chlorine in a reactor at a temperature of 800° C. and where the inert liquid used is carbon tetrachloride.

The hot gaseous effluent coming from the reactor containing, for example, approximately 36 moles each of boron trichloride and carbon monoxide, 9 moles of carbon dioxide, a small amount of entrained carbon and boron oxide or other solids, and possibly some unreacted chlorine, is introduced into the quench tower through inlet line 10. Carbon tetrachloride coming from separator 26 in an amount of approximately 81 moles and 14 moles from solvent storage tank 57 passes into the top of the quench tower 1 through line 30. In the quench tower the hot gaseous effluent is intimately contacted with the inert liquid in sufficient quantity so as to cool it to the temperature obtained by the vaporization of the carbon tetrachloride. The intimate contact may be brought about by introducing the hot gases below the level of the inert solvent maintained in the tower or it may also be accomplished by use of a baffle tower into which the inert liquid is introduced at the top and the gases at the bottom. Generally, the quench tower is equipped with baffles near the top and the vessel filled with the inert liquid above the hot gas inlet so that the hot gases upon entering the quench tower are immediately introduced into the body of the liquid. After being cooled by the vaporization of the inert liquid, the gases with the vaporized liquid pass up the quench tower where they are contacted with the inert liquid reflux coming into the tower. The baffles improve the mixing of the gaseous stream with the fresh liquid. Thus, by using the baffles, the gases and vapor leaving the tower are scrubbed by the incoming reflux liquid and may be further cooled to a temperature near that of the incoming liquid. The amount of quench liquid used is such that substantially all of the solvent introduced into the tower is vaporized with only enough solvent remaining unvaporized to wash down the solids and to maintain the solids in a slurry state at the bottom of the tower.

The entrained solid particles in the gaseous effluent upon contacting the inert liquid in the quench tower precipitate out and are allowed to accumulate at the bottom of the vessel. Periodically the slurry of the solid particles which have settled out may be passed to screw still 11 by opening valve 13 in line 12. The slurry is introduced into the still and the still is operated to vaporize the inert liquid in the slurry. The vaporized liquid is passed into condenser 22 by means of line 21. The auger 14 being rotated by motor 16 discharges the solids through outlet 17 where the solids are discarded. Heat for the screw still is provided by admitting steam into steam jacket 18 by use of steam line 19.

In immediately cooling the hot effluent coming from the reactor, the formation of phosgene is essentially avoided even if some chlorine is present in the effluent. The effluent gases from the reactor are cooled to temperatures below the temperature necessary for phosgene formation so rapidly that little if any of this product is produced.

With the vaporization of approximately all of the 95 moles of carbon tetrachloride introduced in quench tower 1, the boron trichloride, carbon monoxide, carbon dioxide, and the vaporized carbon tetrachloride leave the quench tower at a temperature of about 55° C. and are passed to partial condenser 22 through line 23. Partial condenser 22 is a water cooled condenser. In the condenser the stream is cooled to approximately 30° C. condensing around 81 moles of carbon tetrachloride. After the separation of the condensed carbon tetrachloride from the uncondensed portion in separator 26, the carbon tetrachloride containing some boron trichloride dissolved therein is passed back to the quench tower as reflux by means of lines 29 and 30.

The uncondensed portion of the quench tower effluent comprising essentially the 36 moles of boron trichloride, 14 moles of carbon tetrachloride and 45 moles of carbon monoxide and carbon dioxide are passed from separator 26 by line 28 to partial condenser 27 wherein refrigeration is used to cool the stream to a temperature of about 10° C. and discharging it into separator 31. By cooling the stream to a temperature of 10° C., a major portion of the carbon tetrachloride in the stream and a minor portion of the boron trichloride are liquefied. The liquid portion is passed by means of line 36 to pump 34. The uncondensed portion comprising essentially 31 moles of boron trichloride, 5 moles of carbon tetrachloride and the 45 moles of the noncondensible gases, is discharged from separator 31 by means of line 33 to absorption tower 2. Approximately 126 moles of carbon tetrachloride coming from storage tank 57 is pumped by means of pump 62 through cooler 64 where the solvent is cooled to a temperature of approximately 30° C. by use of water as a cooling medium and then through heat exchanger 65 where by means of refrigeration the carbon tetrachloride is cooled to a temperature below $-15°$ C., preferably approximately $-20°$ C., before being introduced into the absorption column at the top. The cold carbon tetrachloride in passing down through the tower contacts the gas being introduced at the bottom, cooling and absorbing the boron trichloride from the gas stream. The absorption column may be a plate-type column having bubble cap, perforated, or baffle plates, a packed tower, or some other type known in the art.

In passing through the absorption column the carbon monoxide, carbon dioxide, and chlorine, if present, are not absorbed and are vented from the column through vent line 38. With the carbon dioxide and carbon monoxide vented, a small amount of carbon tetrachloride, approximately 0.6 mole, is lost. The rich liquid containing the boron trichloride is withdrawn from the bottom of the tower through line 39 and directed to feed pump 34. By means of pump 34 the condensed portion from separator 31 and the rich liquid from the bottom of the absorption column are pumped to the stripping column passing through heat exchanger 41 to be preheated by the bottoms coming from the stripping column.

The stripping column is a conventional fractionator and is operated at approximately 25 pounds per square inch gauge pressure. The column may contain bubble cap or perforated plates or be a baffle or a packed tower. By operating at a pressure of 25 pounds per square inch gauge, water may be used in the reflux condenser to cool the stripper overhead to a temperature of approximately 30 degrees which is low enough to condense the boron trichloride at this pressure.

In the distillation of the rich liquid, the boron trichloride is vaporized and taken off as an overhead stream. It is passed by means of line 48 to reflux condenser 42 and then into reflux accumulator 43. From accumulator 43 boron trichloride is pumped by means of pump 44 through line 53 where about half of the boron trichloride is returned to the tower as reflux and the remaining half is directed to line 52 where it is discharged to storage. Approximately 36 moles of purified boron trichloride are thus obtained. The carbon tetrachloride substantially free of the boron trichloride is withdrawn as bottoms from the tower and by means of pump 54 pumped through heat exchanger 41 where it is cooled and directed to solvent storage tank 57 from which it may be recycled and reused in the process.

While the drawing and foregoing description have outlined a preferred and specific embodiment of the invention and certain alternative modes of operation thereof, other modifications may be made in details of operation and in the arrangement of the apparatus thereof without departing from the spirit of the scope of the invention. For example, partial condenser 27 and liquid separator 31 may be dispensed with. The uncondensed portion of the gaseous and vaporous effluent coming from the quench tower which is not condensed in condenser 22 may be directly introduced into the absorption column where the uncondensed portion may be further cooled and the boron trichloride absorbed and condensed. A larger absorption tower would be required to effect the additional cooling in the absorption tower. Thus, as shown in the drawing, it is preferred to cool and partially condense the gas stream coming from separator 26 before introducing it into the absorption tower. Also, if at occasions relatively large amounts of volatile contaminates are present in the reaction product, such as chlorine, the absorption column may be modified to be an absorption and stripping column, if desired. In this modification a reboiler would be provided for the absorption column and operated to strip the volatile constituents from the bottoms and vent them with the non-condensible gases.

For simplification of the drawing and of the description, the conventional equipment and control instruments for observing and controlling the temperature, pressures, and liquid levels and the like are not indicated or described specifically. Also the refrigeration system to provide cooling in cooler 65 and partial condenser 27 is not shown.

In addition to carbon tetrachloride other inert liquids which are solvents of boron trichloride having a boiling point in the range of 70 to 200° C. may be used. Illustrative examples are perchloroethylene, chlorobenzenes, tin tetrachloride, and titanium tetrachloride. The liquids having the lower boiling temperatures tend to increase the vent losses encountered in the process and it is preferred to use a liquid boiling in the range of from 100 to 120° C. Other considerations however, such as availability and reactivity with the product must be considered and carbon tetrachloride has certain advantages in this respect over other solvents.

It is apparent that wide variation in temperatures throughout the process may be used. For example condenser 22 may be operated under refrigeration. However, by use of the water condenser, a major portion of the vaporized liquid is condensed and thus a major portion of the heat in cooling the hot gaseous effluent is accomplished by use of a water cooled condenser.

Thus by the use of the process of the invention, a hot gaseous effluent coming from a reactor at temperatures above 600 degrees may be thus processed according to the invention and the boron trichloride separated as a purified fraction. The process is adaptable for continuous operation. By using an inert liquid and cooling the hot gaseous effluent by vaporizing the liquid, the hot gaseous effluent is immediately cooled to the boiling point of the solvent. Thus, if the effluent gas contains chlorine and other constituents from which phosgene may be formed, cooling the gases by quenching decreases the temperature immediately below the required temperature for the reaction of the reactants to form phosgene. Also by contacting the hot gases containing the entrained solids with the liquid, the solids are precipitated out in the quench tower and do not become deposited within the heat exchange equipment to render the heat exchange ineffective.

What is claimed is:

1. A process for the recovery of boron trichloride from a hot gaseous effluent containing entrained particles and non-condensible gases resulting from the reaction of a boron compound with carbon and chlorine at a temperature above 600° C., which comprises passing the hot gaseous effluent in contact with an inert liquid having a boiling point in the range of 70° to 200° C. which is a solvent for the boron trichloride in a ratio such that substantially all of said inert liquid is vaporized, cooling the gaseous and vaporous effluent resulting from the contacting of the hot gases with the inert liquid to condense a major portion of the inert liquid, separating the condensed inert liquid from the uncondensed portion of the gaseous and vaporous effluent, returning the condensed inert liquid as reflux to be contacted with more hot gases, passing the uncondensed portion of the gaseous and vaporous effluent in contact with additional inert liquid cooled to a temperature below −15° C. to absorb and condense substantially all of the boron trichloride in the gaseous stream leaving a gaseous portion comprising essentially of non-condensible gases, separating non-condensible gases from the cold inert liquid containing the boron trichloride, and separating the boron trichloride from the inert liquid.

2. A process according to claim 1 wherein the inert liquid has a boiling point in the range of 100° to 120° C.

3. A process according to claim 1 wherein the inert liquid is carbon tetrachloride.

4. A process for the recovery of boron trichloride from a gaseous effluent containing entrained solids and non-condensible gases resulting from the reaction of a boron compound with carbon and chlorine at a temperature above 600° C., which comprises passing the hot gaseous effluent into contact with a given amount of inert liquid having a boiling point in the range of 70° to 200° C. which is a solvent for the boron trichloride to cool the hot gaseous effluent by vaporizing a portion of the liquid and to precipitate the entrained solids in the unvaporized portion to form a slurry, periodically separating the slurry containing the entrained solids from the unvaporized portion of the inert liquid, separating the entrained solids from the inert liquid in the slurry, returning the inert liquid separated from the entrained solids to be contacted with more hot gases, cooling the gaseous and vaporous effluent resulting from the contacting of the hot gases with the inert liquid to condense a major portion of the inert liquid, separating the condensed inert liquid from the uncondensed portion of the gaseous and vaporous effluent, returning the condensed liquid portion to be contacted with more hot gases, further cooling the uncondensed gaseous and vaporous portion to condense a minor portion of the boron trichloride and substantially all of the inert liquid remaining in the uncondensed portion leaving a gaseous stream consisting essentially of boron trichloride and non-condensible gases, passing the uncondensed gaseous stream of boron trichloride and non-condensible gases in contact with more inert liquid cooled to a temperature below −15° C. to absorb and condense substantially all of the boron trichloride from the gaseous stream, separating the non-condensible gases from the cold inert liquid containing the boron trichloride, separating the boron trichloride from the cold inert liquid, cooling a portion of the cold inert liquid to below −15°, returning the cooled portion to absorb and condense more boron trichloride, and returning the uncooled portion of the cold inert liquid separated from the boron trichloride to be contacted with more of the hot gaseous effluent in first step of the process.

5. A process according to claim 4 wherein the boron trichloride is separated from the cold inert liquid by fractional distillation.

6. A process according to claim 5 wherein the inert liquid has a boiling point in the range of 100 to 120° C.

7. A process according to claim 5 wherein the solvent is carbon tetrachloride.

References Cited in the file of this patent
UNITED STATES PATENTS

| | | |
|---|---|---|
| 1,405,629 | Roberts | Feb. 7, 1922 |
| 2,097,482 | Weber et al. | Nov. 2, 1937 |
| 2,381,027 | Baldeschwieler et al. | Aug. 7, 1945 |
| 2,816,148 | Anderson et al. | Dec. 10, 1957 |
| 2,877,864 | Cromwell et al. | Mar. 17, 1959 |